United States Patent [19]

Reed

[11] 4,255,622
[45] Mar. 10, 1981

[54] EMERGENCY DIALING AID AND MARKING ASSEMBLY

[76] Inventor: Robert E. Reed, 4623 Reinhardt Dr., Oakland, Calif. 94619

[21] Appl. No.: 89,920

[22] Filed: Oct. 31, 1979

[51] Int. Cl.³ .................... H04M 1/26; B42F 21/08
[52] U.S. Cl. .................... 179/90 A; 283/1 R; 283/36; 283/39
[58] Field of Search .......... 283/18, 19, 21, 22, 283/1 R, 1 B, 20, 36, 39; 40/542, 454, 317, 336, 337, 338, 319; 179/90 L, 90 AN, 90 FW, 90 A; 362/24

[56] References Cited

U.S. PATENT DOCUMENTS

| | | | |
|---|---|---|---|
| 1,466,286 | 8/1923 | Hearn | 40/542 X |
| 2,061,097 | 11/1936 | Fordyce | 40/337 |
| 2,624,965 | 1/1953 | Griswold | 40/336 |
| 2,777,228 | 1/1957 | Andrews | 40/337 |
| 3,197,573 | 7/1965 | Anson | 40/337 X |
| 3,914,483 | 10/1975 | Stipek | 283/21 X |
| 3,925,585 | 12/1975 | Aoyagi | 283/18 |
| 3,992,795 | 11/1976 | Rettig | 40/338 |
| 4,026,033 | 5/1977 | Martin | 40/336 |

FOREIGN PATENT DOCUMENTS

| | | | |
|---|---|---|---|
| 2355301 | 11/1973 | Fed. Rep. of Germany | 179/90 FW |
| 2706810 | 8/1978 | Fed. Rep. of Germany | 179/90 L |
| 2809668 | 9/1979 | Fed. Rep. of Germany | 40/337 |

Primary Examiner—Paul A. Bell
Assistant Examiner—John S. Brown
Attorney, Agent, or Firm—Flehr, Hohbach, Test, Albritton & Herbert

[57] ABSTRACT

A luminous aid for indicating a pre-selected emergency number disposed in proximity to means for indicating the appropriate digits to be used on a telephone dial serves to permit the telephone to be operated without requiring additional illumination. A marking assembly for so preparing the telephone includes a pliant sheet of coated material carrying both a label indicating the emergency number as well as continuously luminous markers for use in marking two digits on the telephone dial.

1 Claim, 3 Drawing Figures

U.S. Patent  Mar. 10, 1981  4,255,622
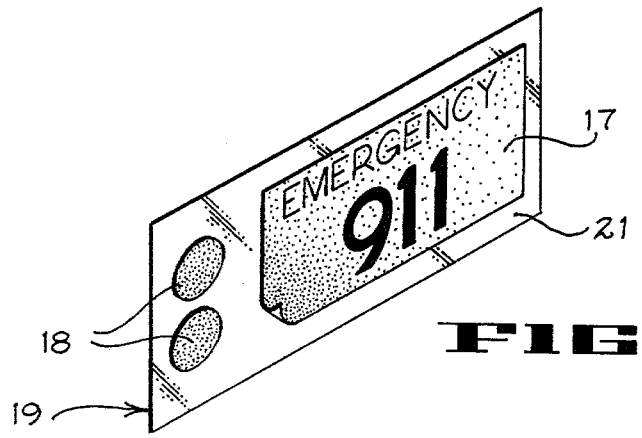
FIG_1
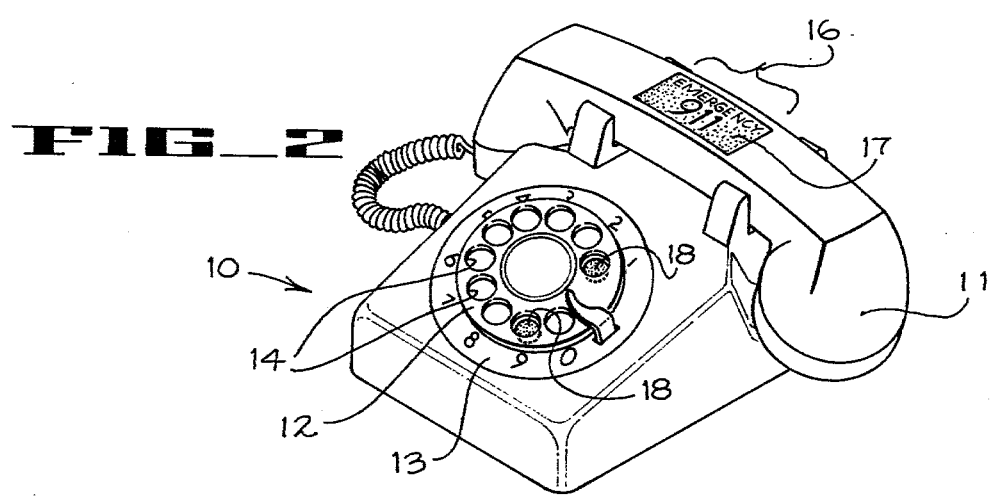
FIG_2
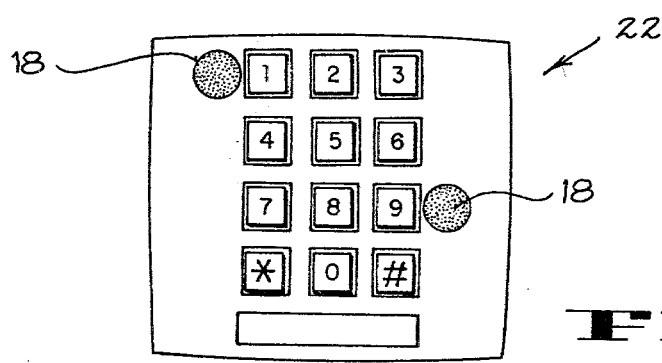
FIG_3

EMERGENCY DIALING AID AND MARKING ASSEMBLY

This invention pertains to an aid for dialing a predetermined emergency telephone number in the dark and to a marking assembly for so providing the above dialing aid to be applied to a telephone.

While it is known that a number of communities in the country have adopted an all-purpose emergency number, namely "911" to be dialed for substantially any and all types of emergency services, e.g. police, fire, ambulance, resuscitation, etc., use of the telephone has been found to be somewhat limited in the case of burglaries detected while in progress. This factor, has made it difficult to apprehend such criminals. Primarily the problem seems to be that in dialing the emergency number "911" a person is typically required to turn on an additional light so as to dial correctly. As disclosed herein an arrangement is provided wherein the emergency number as well as markers associated with digits of the telephone dial will be luminous in the dark to aid a person in knowing the right telephone number to call and in finding the proper digits on the dial.

In addition to the above it is desirable to provide as widespread usage as possible to a system of the foregoing kind without requiring any modification to the telephone itself. Accordingly as disclosed herein a marking assembly is disclosed which can, for example, be simply circulated with the distribution of telephone books.

In general there is provided herein an emergency aid for dialing a predetermined telephone number in the dark using continuously luminous means carried on the telephone for indicating the emergency number to be dialed while also employing continuously luminous means on the dial for identifying only those digits of the predetermined emergency number for guiding a person's finger to operate the dial free of the need for additional illumination.

In addition, a marking assembly comprising a pliant sheet of material having a face of non-adherent material carries continuously luminous label means disclosing a predetermined emergency number thereon which is releasably adhered to the face of the pliant sheet and a plurality of continuously luminous markers releasably adhered to the face of the sheet. The label and markers are formed with an adherent reverse surface adapted to permit the label and markers to be peeled from the non-adherent face of the sheet for application to a telephone as indicated above.

In general, it is an object of the present invention to provide an aid for dialing a predetermined emergency in the dark.

More particularly, it is an object of the present invention to provide an aid for dialing the emergency number "911" without requiring additional illumination.

It is a further object of the present invention to provide a simplified marking assembly supporting the appropriate materials for properly marking a telephone without requiring a service call by the telephone company.

The foregoing and other objects of the invention will become more readily evident from the following detailed description of a preferred embodiment when considered in conjunction with the drawings.

FIG. 1 shows a diagrammatic perspective view of a marking assembly according to the invention;

FIG. 2 shows a diagrammatic perspective view of a telephone according to the invention;

FIG. 3 shows a diagrammatic view of a portion of a push-button dial for a telephone, according to another embodiment of the invention.

A telephone 10 of conventional style having a hand piece 11 and a dial 12 associated with an annular surface 13 carrying a sequence of ten digits commencing with the numeral one ("1") and proceeding counterclockwise to the numeral ("0"). As is known, when the dial 12 is at rest each of the finger openings 14 are aligned with an associate one of the ten digits in the ring 13.

An indicia region 16 defined along the back of hand piece 11 carries a continuously luminous label 17 thereon indicating the emergency number "911".

Continuously luminous marker means 18 are disposed only at the position for the digits "1" and "9" so as to identify the digits of emergency number "911". In this manner these luminous markers identify the proper digit positions so as to guide a person's finger to operate the dial free of additional illumination.

As shown in FIG. 1, a marking assembly comprises a pliant sheet 19 of material, such as paper, having a face 21 treated with a non-adherent material such as plastic of synthetic fluorine containing resins and sold under the trademark "Teflon". Continuously luminous label means 17 discloses the predetermined emergency number "911" thereon. Label means 17 is releasably adhered to the face 21 of sheet 19.

A plurality of continuously luminous markers 18 are releasably adhered to the face 21 of sheet 19. The label means 17 and markers 18 are formed with a suitably adherent reverse surface adapted to permit the label means and markers to be peeled from the face 21 for application to the telephone. Label 17 is adapted to be attached to a clearly visible portion of the telephone in a position to absorb radiant energy while thereon such as in the indicia region 16 of hand piece 11. Markers 18 are also adapted to be applied to continuously identify those digits associated with the predetermined emergency number 911.

While there has been shown a rotary style of telephone dial, it will be readily evident that the push-button style of telephone dial 22 can be equipped with continuously luminous indicators for digits "1" and "9" preferably applied alongside the keys "1" and "9" due to the configuration of the push-button dial which places the "1" and "9" at an "outside" position. A continuously luminous label 17 indicating the appropriate emergency number at an indicia region of the phone adjacent the dial. It is to be appreciated that the location of the appropriate emergency number in indicia region 16 on the telephone serves to ensure that the emergency number will be readily available and observable by the party seeking to dial the telephone in the dark.

Thus, in both instances the indicator is disposed adjacent the appropriate dialing key. By disposing indicia region 16 on the top of the hand piece it will be in full light of day during daylight hours so as to absorb appropriate light energy as to make it luminous during the darkness. From the foregoing it will be readily evident that there has been provided an aid for dialing a given emergency number without requiring additional illumination as well as an aid serving to indicate the predetermined telephone number to be called.

I claim:

1. In a telephone of a type having a hand piece and dial means associated with a sequence of ten digits progressing from "1" to "0", an aid for dialing a preselected telephone number in the dark comprising a continuously luminous label adhered to the telephone and displaying a preselected telephone number in the dark, a plurality of continuously luminous discrete marker elements disposed proximate associated ones of only those digits of said preselected number for identifying same free of additional illumination.

* * * * *